A. KNUDSON.
VELOCIPEDES.
No. 177,854. Patented May 23, 1876.
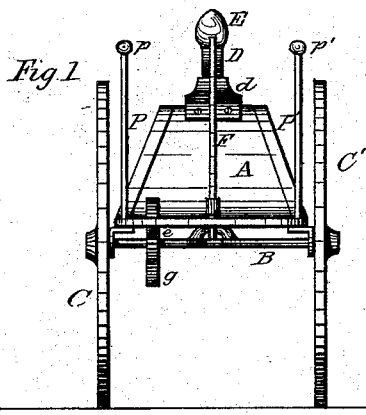
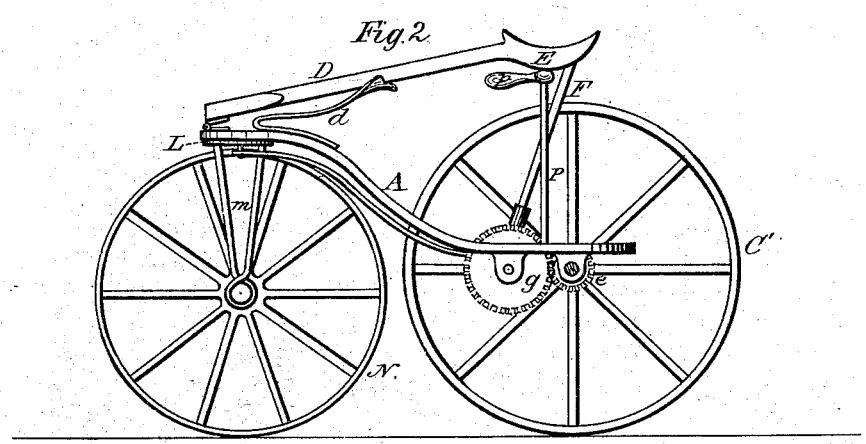
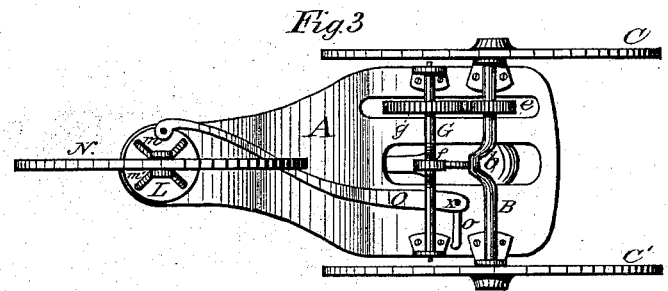
Attest:
Wm Baggers
C. A. Snow
Inventor:
Adolph Knudsen
by Louis Bagger
his Atty.

UNITED STATES PATENT OFFICE.

ADOLPH KNUDSON, OF CHICAGO, ILLINOIS.

IMPROVEMENT IN VELOCIPEDES.

Specification forming part of Letters Patent No. 177,854, dated May 23, 1876; application filed October 22, 1875.

*To all whom it may concern:*

Be it known that I, ADOLPH KNUDSON, of Chicago, in the county of Cook and State of Illinois, have invented certain new and useful Improvements in Velocipedes; and we do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a rear view. Fig. 2 is a side elevation, one wheel being removed; and Fig. 3 is a bottom plan.

Similar letters of reference indicate corresponding parts in all the figures.

This invention relates to that class of velocipedes that have three wheels, one of which is the guiding or steering wheel; and it consists in the construction and arrangement of its parts in such a manner that the weight of the occupant is employed as the motive power, substantially as hereinafter more fully set forth, and pointed out in the claim.

In the drawing, A is the frame or platform of the machine, which is curved, so that the front part thereof is considerably higher than the rear. The rear part of the frame rests upon the axle B, which has two wheels, one of which, C, is rigidly affixed upon, and rotates with, said axle, while the other, C', is loose. This is for the purpose of enabling the machine to turn short, which could not well be effected if both the wheels C C' were rigidly secured upon the axle. Axle B is bent in the middle, so as to form a crank, *b*, for the purpose hereinafter described.

To the front part of frame A is hinged, by its one extremity, the seat-bar D, which is supported upon a spring, *d*. To the under side of the seat E, which is affixed upon the end of bar D opposite to the hinging-point, is pivoted a pitman, F, by means of which axle B may be rotated by the crank *b*. Under the frame A, in front of axle B, is a shaft, G, having a gear-wheel, *g*, that engages with another smaller gear-wheel, *e*, upon axle B. Shaft G is bent like the axle B, so as to form a crank, *f*, with which the pitman F may be made to engage. An upright, P, having handle *p*, is affixed to one side of the rear part of frame A, in such a manner that the handle *p* may be readily grasped by the person occupying the seat E. A correspondingly-shaped upright, P', having handle *p'*, is pivoted in frame A opposite to upright P. Upright P' is in reality a bent lever, the short arm of which, *o*, slides upon the under side of frame A, as shown in Fig. 3 of the drawing. Arm *o* is pivoted at *x* to a connecting-rod, O, by which the turn-disk L, which is pivoted under the front part of frame A, is operated. The turn-disk L has two downward-projecting brackets, *m m'*, between which the front wheel N is pivoted. Thus, when the turn-disk L is turned by the occupant of the velocipede by means of upright P', the front wheel N is turned with it, thus steering or guiding the vehicle in any desired direction.

The manner of using my improved velocipede will be readily understood from the foregoing description. The pitman F being adjusted either upon axle B or shaft G, according to the speed it is desired to obtain, the occupant mounts the seat E, upon which he throws his full weight in order to properly start the vehicle. He then grasps the handles *p p'* of uprights P P', when he can easily, by pressing his feet against the platform, operate the pitman F, and by it the axle B or shaft G. The steering device is operated by means of upright P'.

Having thus described my invention, I claim and desire to secure by Letters Patent of the United States—

In a velocipede, the combination of the vibrating seat-bar D, having seat E, with the uprights P P', substantially as and for the purpose herein shown and specified.

In testimony that I claim the foregoing as my own I have hereunto affixed my signature in presence of two witnesses.

ADOLPH KNUDSON.

Witnesses:
TH. CLANSTEEN,
S. M. WIUM.